United States Patent [19]

Hornyak et al.

[11] 3,939,289
[45] Feb. 17, 1976

[54] DRY CARBONATION SOURCE FOR A BEVERAGE CONCENTRATE AND METHOD OF PREPARING THE SAME

[75] Inventors: John Hornyak, Yonkers; Howard D. Stahl, Hartsdale, both of N.Y.

[73] Assignee: General Foods Corporation, White Plains, N.Y.

[22] Filed: Apr. 2, 1973

[21] Appl. No.: 347,309

[52] U.S. Cl. ............... 426/548; 426/477; 426/561; 426/591; 426/518
[51] Int. Cl.² ........................................... A23L 1/22
[58] Field of Search ............ 426/96, 147, 191, 366, 426/225, 477, 217, 591, 289, 518, 548, 561; 252/310, 313 R; 241/26, 27, 30; 424/44

[56] References Cited
UNITED STATES PATENTS

| | | | |
|---|---|---|---|
| 1,450,865 | 4/1923 | Pelc | 426/225 |
| 2,851,361 | 9/1958 | Diller | 426/191 |
| 3,667,962 | 6/1972 | Fritzberg et al. | 426/191 |
| 3,780,189 | 12/1973 | Scott | 426/217 |

FOREIGN PATENTS OR APPLICATIONS

| | | | |
|---|---|---|---|
| 502,324 | 3/1939 | United Kingdom | 426/191 |

*Primary Examiner*—Robert L. Lindsay, Jr.
*Assistant Examiner*—Peter Chin
*Attorney, Agent, or Firm*—Thaddius J. Carvis; Daniel J. Donovan; Bruno P. Struzzi

[57] ABSTRACT

A dry carbonation source for preparing carbonated beverages, the method of preparing the carbonation source and a carbonated beverage concentrate employing the same are provided. The dry carbonation source is prepared by co-grinding calcium carbonate with an anhydrous, non-toxic acid. This dry carbonation source will rapidly dissolve to provide a clear, carbonated beverage with no undesirable sediment or unsightly surface film when mixed with water, a sweetener and a flavorant.

15 Claims, No Drawings

DRY CARBONATION SOURCE FOR A BEVERAGE CONCENTRATE AND METHOD OF PREPARING THE SAME

BACKGROUND OF THE INVENTION

The present invention relates to carbonated beverages. More specifically, the present invention relates to a dry carbonation source for use in preparing carbonated beverages, the method for preparing this carbonation source, and a carbonated beverage concentrate employing it.

The need for a dry carbonated beverage concentrate has existed for a long time. And, this need has been accentuated in recent years due to an increased awareness of the ecological limitations associated with canned and bottled carbonated beverages.

Early formulatory work on dry carbonated beverage concentrates predominantly utilized the carbonates and bicarbonates of sodium, potassium and ammonium as the sources of carbonation (e.g. Diller et al., U.S. Pat. No. 2,851,359). However, these carbonate sources are generally unacceptable when present in amounts sufficient to provide a desirable level of carbonation. Upon reaction with the acid in the beverage, whereby carbon dioxide is released, the corresponding sodium, ammonium and potassium salts are formed. The resultant, undesirable brackish taste can be alleviated to some degree by using a combination of these carbonates, but it generally persists thereby diminishing the palatability of the beverage.

The taste produced by the presence of calcium ions was found to be considerably more tolerable than that of the sodium, ammonium or potassium ions. Accordingly, several workers have suggested employing calcium carbonate alone or in combination with other carbonates or bicarbonates to improve the palatability of carbonated beverages prepared from dry mixes (e.g. Diller et al. in U.S. Pat. Nos. 2,851,360 and 2,851,361, and Alther et al. in U.S. Pat. No. 2,603,569 and No. 2,639,238).

Calcium carbonate has not, however, been readily accepted. Because calcium carbonate is relatively insoluble, dry beverage concentrates employing it generally take excessively long periods of time to dissolve. Moreover, most commercial grades of calcium carbonate leave undesirable sediments, commonly referred to as sinkers, when used in amounts sufficient to provide desirable levels of carbonation.

To be acceptable, a dry carbonated beverage concentrate must be conveniently dissolved in ice water and provide a beverage which is appealing in both taste and appearance. An important factor relating to the convenience of the beverage concentrate is the time which it takes to completely dissolve in ice water. In general, for consumer acceptance as a convenience product, the beverage mix should fully dissolve within a short period of time, e.g. about two minutes and preferably about one minute. Moreover, the time for solution should be minimized to prevent loss of carbon dioxide to the air during solution. For most beverages, the beverage will not have an appealing appearance unless all cloud and sediment dissappear to provide a completely crystal clear beverage. As exceptions, certain flavors such as orange, lemon and grapefruit may tolerate the presence of a slight cloud. However, in no case is the presence of any noticeable degree of sediment desirable.

The degree of carbonation and the tartness of the beverage are significant factors relating to the palatability of the beverage. It is generally preferred that the beverage contain sufficient carbonation to yield at least about 1.0, and preferably at least about 1.3, volumes of carbonation per volume of liquid and have a final pH upon dissolution of from about 4.5 to 5.2. This is because carbonated beverages exhibit an increased tartness as compared with non-carbonated beverages of the same pH. It has been determined that carbonated beverages exhibiting pH values below about 4.5 – 5.2 exhibit an undesirably high level of tartness. Moreover, the beverage should be free from any brackish taste which would detract from the palatability of the beverage.

SUMMARY OF THE INVENTION

Accordingly, it is an object of the present invention to provide a dry carbonation source and a method for preparing it, and a dry carbonated beverage concentrate which will avoid many of the problems encountered by prior workers and provide a clear, carbonated beverage with no undesirable sediment or unsightly surface film.

It is a further object of the present invention to provide a dry carbonation source and a dry carbonated beverage concentrate employing the dry carbonation source which will completely dissolve to provide a carbonated beverage within an acceptably short period of time.

It is a yet further object of the present invention to provide a method for preparing a dry carbonation source which will completely dissolve to provide a clear, carbonated beverage within an acceptably short period of time.

It is another object of the present invention to provide a dry carbonation source and a dry carbonated beverage concentrate capable of providing a carbonated beverage free from any brackish taste or sediment, but yielding a desirably high level of carbonation within an acceptably short period of time.

It is yet another object of the present invention to provide a method for preparing a dry carbonation source capable of providing a carbonated beverage free from any brackish taste or sediment, but yielding a desirably high level of carbonation within an acceptably short period of time.

It is another object of the present invention to provide a dry carbonation source and a dry carbonated beverage concentrate which are relatively inexpensive, yet provide desirable levels of carbonation in carbonated beverages free of any brackish taste and which dissolve completely within acceptably short periods of time.

It is a yet further object of the present invention to provide a method for preparing a dry carbonation source which is relatively inexpensive, yet provides a desirable level of carbonation in a carbonated beverage free of any brackish taste, and which dissolves completely within an acceptably short period of time.

These and other objects are accomplished according to the present invention which provides a dry carbonation source, a method for preparing the dry carbonation source, and a dry carbonated beverage concentrate employing the same. The dry carbonation source of the present invention is prepared by co-grinding calcium carbonate with an anhydrous, non-toxic acid. The co-grinding preferably grinds the aggregates of calcium carbonate into finely-divided particles ranging from less than about 100 millimicrons up to about 10 microns, causes intimate association with the acid and grinds the acid to an average particle size of less than about 100 microns. The dry carbonation source can be blended with a flavorant and a sweetener to formulate a dry carbonated beverage concentrate.

DETAILED DESCRIPTION OF THE INVENTION

The reaction between calcium carbonate and the acid releasing the carbon dioxide into solution is heterogenous. The reation rate is dependent upon the exposed surface area of the calcium carbonate. The finest commercially available precipitated calcium carbonates have an average primary particle size of about 30 to 40 millimicrons. In reality, however, the primary particles are rarely present. During preparation, the calcium carbonate particles tend to aggregate. These aggregates are only difficultly dissolved in the acid solutions on the type employed according to the present invention and cause a persistent sediment. It has been found that even extensive and vigorous stirring does not cause the sediment to dissolve. Moreover, stirring must be kept to a minimum in intensity and duration so as not to evolve the $CO_2$ already in solution.

One would expect, for a given sample of calcium carbonate, that the reactivity would increase and the amount of undissolved sediment would decrease with decreasing particle sizes. This is explained by the fact that the smaller particles possess larger surface areas and, presumably, a greater dispersability. Ideally, this would permit more effective participation in the heterogenous reaction. We have observed, however, that irrespective of the degree to which the calcium carbonate may be ground or milled separately, the primary particles of the calcium carbonate tend to aggregate into difficultly dissolved particles. This results in a high percentage of sinkers, and an unduely lengthy time for reaction to occur.

A prime feature of the present invention is the discovery that by co-grinding the calcium carbonate to the desired particle size together with an acid, which is a necessary component of a dry carbonated beverage concentrate, a dry carbonation source can be obtained which reacts more rapidly and more completely than where the calcium carbonate and the acid are ground separately to the same degree before blending. It is possible that the tendency for the calcium carbonate to reaggregate into difficultly dissolvable large particles is inhibited by the co-grinding. It is believed that the acid acts as a barrier, preventing reagglomeration. In any event, the improved result is real and reproduceable and we do not wish to be bound by any specific theory.

The particular crystalline form of the calcium carbonate is not critical to the present invention, but may be any of those commercially available. Finely-divided, precipitated calcite having an average primary particle size of less than about 100, preferably less than 40, millimicrons has been found to be desirable. This form of calcium carbonate is commercially available as Purecal U from Wyandote Corp. The aggregates of the calcium carbonate particles should be capable of being reduced during the co-grinding to below about 10 microns and preferably below about 3 microns for satisfactory reactivity. It will be obvious to those skilled in the art that the calcium carbonate should be supplied as a dry powder to avoid reaction with the acid. While the exact degree of moisture is not presently believed critical to the present invention, it will be apparent to those skilled in the art that it should be as low as possible to prevent premature reaction between the carbonate and the acid. Moisture levels for the calcium carbonate and the acid of less than about 0.0% by weight have been found satisfactory.

The calcium carbonate is co-ground with a non-toxic, anhydrous acid to reduce the size of the calcium carbonate aggregates as noted above, and to reduce the particle size of the anhydrous acid to less than about 100, and preferably about 5, microns. The anhydrous, non-toxic acid can be any of those commonly employed which are capable of being stored dry at a moisture content of less than about 0.01%. Typical of the acids which can be employed according to the present invention are citric, malic, fumaric, adipic and other like acids. The acid is preferably employed during the grinding step in the amount, relative to the calcium carbonate, which is to be employed in the beverage concentrate. However, it is possible to employ somewhat lower amounts during the grinding operation and to then blend the remainder after completion of the grinding. Preferably, the acid in the dry carbonation source will be present in amounts of about 1 to 20%, and more preferably 1 to 10%, in excess of the amount theoretically required to release all of the carbon dioxide from the calcium carbonate and a supplemental carbonation source if one is employed.

The acid and the calcium carbonate are desirably blended before co-grinding; however, they may be fed from separate sources directly into the grinding apparatus. Any of the known means for grinding dry particulate matter to the desired size range can be employed according to the present invention. Typical of these devices are freezer mill, jet atomizer mill, hammer mill and ball mill. Those skilled in the art will be aware of the details of the known grinding procedures and further elaboration here is not deemed necessary as these details form no part of the present invention.

After co-grinding the acid with the calcium carbonate, the resulting dry carbonation source may be employed in this form for preparing a slightly-acid, soda-water-type beverage. Preferably, however, the dry carbonation source of the present invention is blended with a flavorant and if desired a sweetener and a supplemental carbonation source. Suitable flavorants include any of the common soft drink flavors which can be supplied at the desired moisture levels. Typical flavors can include cherry, orange, lemon, lime, grapefruit, strawberry, raspberry, rootbeer, cola, chocolate, vanilla, grape, punch, etc.

Additionally, the dry carbonated beverage concentrate should employ a sweetening agent. Generally, any of the known, non-toxic natural or synthetic sweeteners can be employed. Of the natural sweeteners, sucrose is preferred; however, other sugars such as fructose, dextrose, etc.; certain amino acids such as L-alanine and glycine; certain alcohols such as sorbitol, mannitol and xylitol; vegetable extracts such as glycyrrhiza globra; and the like can be employed. Exemplary of the synthetic sweeteners which can be employed are saccharin, cyclamate salts, and certain dipeptides and their salts such as L-aspartyl-L-phenylalanine methyl ester, and the like.

The dry carbonation source of the present invention can be employed without any additional carbonation producing material at concentrations of up to about 0.3% based on the weight of the beverage without any noticeable brackish taste. However, the carbonation source of the present invention is preferably employed in amounts sufficient to obtain a calcium ion concentration in the final beverage of from about 0.15 to 0.26%, in combination with a supplemental carbonation source such as sodium carbonate, sodium bicarbonate, potassium carbonate, potassium bicarbonate, ammonium carbonate, ammonium bicarbonate or combination thereof, which is employed in amounts sufficient to bring the carbonation to the desired level of greater than about 1.0, and preferably greater than about 1.3, volumes of carbon dioxide per volume of final beverage. In the dry beverage concentrate, the acid is always employed in a major amount and the calcium carbonate in a minor amount as constituent parts of the dry carbonation source.

Those skilled in the art will be aware of the desired amounts of the various sweetening and flavoring agents which can be employed alone or in combination. A typical dry carbonated beverage concentrate according to the present invention can have the following formulation on a dry basis:

3.15% calcium carbonate;
  6.25% malic acid;
  1.82% sodium bicarbonate;
  88.60% sucrose;
  0.15% orange flavorant; and
  0.03% lemon flavorant.

To prepare a single serving of beverage, approximately 27 grams of this concentrate are added to approximately 6 ounces of water.

Because the calcium carbonate and the acid react in the presence of moisture to release carbon dioxide gas, it is important to maintain the dry carbonation source and the dry carbonated beverage concentrate of the present invention at relatively low moisture levels. For optimum storage stability, the dry carbonation source and dry carbonated beverage concentrate should be stored in moisture impermeable containers. A desiccant can optionally be employed in the containers. Glass jars and sealed envelopes of a metal foil-polymer film laminate are exemplary of suitable containers. Those skilled in the art will be aware of the most suitable techniques for achieving and maintaining the desired moisture content, and these details form no part of the present invention.

The following examples are presented for the purpose of further illustrating and explaining the present invention and are not to be taken as limiting in any sense. Unless otherwise indicated, all parts and percentages are by weight.

EXAMPLE 1

This example illustrates a preferred method for preparing a dry carbonation source according to the present invention. A quantity of malic acid was ground in a Mikro-Samplmill hammer mill fitted with a 0.010 herring bone slot retaining screen insert. Then 377.5 g of the ground malic acid were blended with 180.6 g of Purecal U calcium carbonate in a Hobart mixer using a wire wisk. This blend was (1) ground by passing it through the hammer mill, (2) blended again in the Hobart mixer, (3) ground by a second pass through the hammer mill, (4) blended again in the mixer, and (5) ground by a third pass through the hammer mill. This procedure yielded the dry carbonation source as a very fine, free-flowing powder.

EXAMPLE 2

A dry carbonated beverage concentrate according to the present invention is formulated by admixing the following ingredients in a glass:

1.45 g. of the dry carbonation source prepared in Example 1,
  0.113 g. of Sodium bicarbonate,
  0.316 g. of Potassium bicarbonate, and
  13.6 g. of sucrose.

To this dry admixture was added 100 ml. of ice water. The contents of the glass were then moderately agitated. The solids completely dissolved to give a clear beverage in 35 seconds. The beverage had an acceptable level of carbonation and a pH of 4.95.

The following fourteen Examples, 3–16, are presented for the purpose of further illustrating the present invention and comparing it to the known procedure of grinding an acid component and calcium carbonate separately and blending these pre-ground materials to formulate a beverage concentrate. Except where indicated, blending was performed for the indicated time in a Patterson-Kelly twin shell dry blender (2½ inch dia.) And except as indicated, grinding was accomplished by a single pass through a Mikro-Samplmill hammer mill using a 0.010 herringbone slot retaining screen insert. In each Example, the samples were evaluated in a standard beverage formulation comprising 0.0167 equivalents of the indicated acid, 0.64 g of calcium carbonate, and 0.28 g of sodium bicarbonate, admixed in 100 g of ice water. Where indicated, 13.6 g of sucrose was also employed. The calcium carbonate was commercially available Purecal U. The beverages were moderately agitated and allowed to stand for about 3 minutes before collecting the sediment by filtration and evaluating it for calcium carbonate by reaction with a known quantity of HCl and then titration with NaOH. Where more than a single run was made for a particular Example, the outside limits of the amounts of sediment obtained are indicated.

EXAMPLE 3

Calcium carbonate and malic acid were blended for 3 minutes and then ground. Only 0.00 to 0.10% of the calcium carbonate remained as sediment.

EXAMPLE 4

The sample prepared in Example 3 was evaluated using sucrose in the evaluation. Only 0.05% of calcium carbonate remained unreacted.

EXAMPLE 5

The procedure of Example 3 was repeated using citric acid in place of the malic acid and using sucrose in the beverage formulation. The sediment amounted to 0.0 to 0.06% of the calcium carbonate in the beverage formulation.

EXAMPLE 6

A blend of malic acid and calcium carbonate were ground in a Spex freezer mill operated at − 196° C. Only 0.07% unreacted calcium carbonate remained as sediment in the beverage.

EXAMPLE 7

The procedure of Example 6 was repeated employing sucrose in the beverage formulation. Here, 0.08% of the calcium carbonate remained as sediment.

EXAMPLE 8

Calcium carbonate and malic acid was dry blended with a spatula along with sodium bicarbonate. After solvation with ice water, 2.1 to 2.8% unreacted calcium carbonate remained as sediment.

EXAMPLE 9

The procedure of Example 8 was repeated employing sucrose in the beverage formulation. This time 0.5 to 0.7% of unreacted calcium carbonte remained as sediment.

EXAMPLE 10

Malic acid, sodium bicarbonate, calcium carbonate and sucrose were blended in a Brabender Sigma mixer for 30 minutes. After solvation, 0.2% of the calcium carbonate remained as sediment.

EXAMPLE 11

Citric acid and calcium carbonate were ground separately and then blended for 3 minutes. After solvation, 2.0 to 8.7% of the calcium carbonate remained as sediment.

EXAMPLE 12

The procedure of Example 11 was repeated except that malic acid was used in place of the citric acid. Here, 3.6 to 4.0% of the calcium carbonate remained as sediment.

EXAMPLE 13

The procedure of Example 11 was repeated except that the blending was continued for 5 hours. Even here, 0.3 to 0.4% of the calcium carbonate remained as sediment.

EXAMPLE 14

The sample prepared in Example 13 was evaluated using sucrose in the beverage formulation. In this instance, 0.2 to 0.3% of calcium carbonate still remained as sediment.

EXAMPLE 15

Malic acid and calcium carbonate were blended for 5 minutes. The sodium bicarbonate was admixed with the blend and the admixture was blended for 5 more minutes. Then sucrose was added and the dry ingredients were blended for 5 hours before evaluation with ice water. After solvation, 1.2 to 1.6% of the calcium carbonate remained as sediment.

EXAMPLE 16

Malic acid and calcium carbonate were blended for 5 hours and evaluated. Here, 1.4 to 2.1% of the calcium carbonate remained as sediment.

Many modifications and variations of the present invention will become apparent to those skilled in the art upon reading the above specification. It is intended that all such modifications and variations be included within the scope of the present invention which is defined by the following claims.

What is claimed is:

1. A process for preparing a dry carbonation source for use in preparing a carbonated beverage comprising: co-grinding calcium carbonate and an anhydrous, solid, water-soluble nontoxic acid wherein the cogrinding of the calcium carbonate and the acid
   a. grinds the aggregates of calcium carbonate into finely-divided particles having an average primary particle size of less than about 100 millimicrons and being substantially free of aggregates in excess of about 10 microns,
   b. causes intimate association of the acid with the calcium carbonate, and
   c. grinds the acid to an average particle size of less than about 100 microns.

2. A process for preparing a dry carbonation source according to claim 1 wherein:
   the aggregates of calcium carbonate are ground during the co-grinding thereof with the acid into finely divided particles having an average primary particle size of less than about 40 millimicrons and are substantially freed of aggregates in excess of about 3 microns in diameter.

3. A process for preparing a dry carbonation source according to claim 1 wherein the acid comprises citric, fumaric or malic acid.

4. A process for preparing a dry carbonation source for use in preparing a carbonated beverage comprising:
   a. blending dry, particulate calcium carbonate with an anhydrous, solid, water-soluble, non-toxic acid; and
   b. co-grinding the calcium carbonate and the acid to cause intimate association of the calcium carbonate and the acid wherein the calcium carbonate is ground into finely-divided particles having an average primary particle size of less than about 100 millimicrons and is substantially freed of aggregates larger than about 10 microns.

5. A process according to claim 4 wherein the acid comprises citric, malic, fumaric, or adipic.

6. A process according to claim 5 wherein the acid is ground into finely-divided particles having an average particle size of less than about 100 microns.

7. A process for preparing a dry carbonated beverage concentrate comprising:
   a. co-grinding calcium carbonate and an anhydrous, solid, water-soluble, non-toxic acid to prepare a dry carbonation source wherein the calcium carbonate is ground into finely-divided particles having an average primary particle size of less than about 100 millimicrons and is substantially freed of aggregates larger than about 10 microns
   b. blending a flavorant with the dry carbonation source.

8. A process for preparing a dry carbonated beverage concentrate according to claim 28 which further comprises:
   blending a supplemental carbonation source with the other dry mix ingredients after co-grinding the acid and the calcium carbonate.

9. A process according to claim 7 wherein the acid comprises citric, malic, fumaric or adipic.

10. A process according to claim 9 wherein the acid is ground into finely-divided particles having an average particle size of less than about 100 microns.

11. A process according to claim 10 which further comprises blending a supplemental carbonation source with the other dry mix ingredients after co-grinding the acid and the calcium carbonate.

12. A process according to claim 11 wherein the supplemental carbonation source comprises a sodium, potassium or ammonium carbonate or bicarbonate or any combination thereof.

13. A process according to claim 12 which further comprises:

blending a sweetener with the other dry mix ingredients after co-grinding the acid and the calcium carbonate.

14. A process according to claim 13 wherein the sweetener comprises sucrose.

15. A process according to claim 13 wherein the sweetener comprises L-aspartyl-L-phenylalanine methyl ester.

* * * * *

UNITED STATES PATENT OFFICE
CERTIFICATE OF CORRECTION

Patent No. 3,939,289               Dated   February 17, 1976

Inventor(s)   John Hornyak et al.

It is certified that error appears in the above-identified patent and that said Letters Patent are hereby corrected as shown below:

In column 4, line 5, change "0.0%" to -- 0.01% --.

Signed and Sealed this twenty-second Day of June 1976

[SEAL]

Attest:

RUTH C. MASON
*Attesting Officer*

C. MARSHALL DANN
*Commissioner of Patents and Trademarks*